United States Patent [19]
Arterbury et al.

[11] Patent Number: 5,190,102
[45] Date of Patent: Mar. 2, 1993

[54] SINTERED METAL SUBSTITUTE FOR PREPACK SCREEN AGGREGATE

[75] Inventors: Bryant A. Arterbury; James E. Spangler, both of Houston; Thomas V. Malorzo, Dallas, all of Tex.

[73] Assignee: Otis Engineering Corporation, Carrollton, Tex.

[21] Appl. No.: 807,720

[22] Filed: Dec. 16, 1991

Related U.S. Application Data

[63] Continuation-in-part of Ser. No. 601,271, Oct. 22, 1990, Pat. No. 5,088,554.

[51] Int. Cl.$^5$ .................... B01D 39/10; E21B 43/08
[52] U.S. Cl. .................... 166/228; 29/163.8; 29/902; 210/500.25; 210/510.1; 210/497.01; 419/5; 419/28; 419/39
[58] Field of Search .............. 166/228, 233, 227; 210/500.25, 510.1, 497.01; 419/5, 8, 28, 39, 42; 29/163.8, 163.6, 902, 905

[56] References Cited

U.S. PATENT DOCUMENTS

| | | | |
|---|---|---|---|
| 1,874,035 | 8/1932 | Fletcher | 166/228 |
| 2,139,975 | 12/1938 | Utt | 166/228 X |
| 2,335,558 | 11/1943 | Young | 166/228 |
| 2,554,343 | 5/1951 | Pall | 210/510.1 |
| 2,600,150 | 6/1952 | Abendroth | 166/228 |
| 2,826,805 | 3/1958 | Probst et al. | 210/510.1 |
| 2,963,163 | 12/1960 | Veres | 29/163.8 |
| 3,033,783 | 5/1962 | Lubben | 29/163.8 |
| 3,201,858 | 8/1965 | Valyi | 29/163.8 |
| 3,313,621 | 4/1967 | Mott | 419/36 |
| 3,567,437 | 3/1971 | Mott | 419/42 |
| 3,605,245 | 9/1971 | Zapf | 419/39 |
| 4,071,937 | 2/1978 | Rohlig | 419/8 |
| 4,072,616 | 2/1978 | Rohlig | 210/493.5 |
| 4,483,820 | 11/1984 | Schelb | 419/28 |
| 4,811,790 | 3/1989 | Jennings, Jr. et al. | 166/278 X |
| 4,821,800 | 4/1989 | Scott et al. | 166/228 |

*Primary Examiner*—Stephen J. Novosad
*Attorney, Agent, or Firm*—Dennis T. Griggs

[57] ABSTRACT

A prepack well screen assembly has a resistance welded outer screen concentrically mounted in radially spaced relation on a perforated mandrel, thereby defining an annulus in which a sintered metal prepack sleeve is loaded. The longitudinal spacing distance between adjacent turns of the outer screen selectively exclude sand fines of a predetermined minimum size. The porosity of the sintered metal prepack sleeve is selected to pass sand fines in the size range of from about 20 microns to about 150 microns. The effective inlet flow area through the sintered metal prepack sleeve is substantially greater than the effective inlet flow area through the outer screen. The sintered metal prepack screen excludes sand fines from inflowing formation fluid during the initial production phase following a gravel pack operation, without limiting production of formation fluid.

22 Claims, 3 Drawing Sheets

SINTERED METAL SUBSTITUTE FOR PREPACK SCREEN AGGREGATE

CROSS REFERENCE TO RELATED APPLICATION

This application is a continuation-in-part of U.S. application Ser. No. 07/601,271 filed Oct. 22, 1990, now U.S. Pat. No. 5,088,554.

1. Field of the Invention

This invention relates generally to apparatus for completing downhole wells, and in particular to well screens for filtering unconsolidated material out of inflowing well fluid in water, oil, gas and recovery wells.

2. Background of the Invention

In the course of completing an oil and/or gas well, it is common practice to run a string of protective casing into the well bore and then to run the production tubing inside the casing. At the well site, the casing is perforated across one or more production zones to allow production fluids to enter the casing bore. During production of the formation fluid, formation sand is also swept into the flow path. The formation sand is relatively fine sand that erodes production components in the flow path.

In some completions, the well bore is uncased, and an open face is established across the oil or gas bearing zone. Such open bore hole (uncased) arrangements are utilized, for example, in water wells, test wells and horizontal well completions.

One or more sand screens are installed in the flow path between the production tubing and the perforated casing (cased) or the open well bore face (uncased). A packer is customarily set above the sand screen to seal off the annulus in the zone where production fluids flow into the production tubing. The annulus around the screen is packed with a relatively coarse sand or gravel which acts as a filter to reduce the amount of fine formation sand reaching the screen. A work string and service seal unit (SSU) is used to spot the gravel around the screen. During well completion, gravel is also pumped and squeezed into the producing formation around the screen for filtering unconsolidated material out of the infilling well fluid. The gravel is pumped down the work string in a slurry of water or gel and is spotted directly under the packer or above the sand screen. The gravel also fills the annulus between the sand screen and the well casing. In well installations in which the screen is suspended in an uncased open bore, the gravel pack supports the surrounding unconsolidated formation.

3. Description of the Prior Art

Conventional sand screens employ a perforated mandrel which is surrounded by longitudinally extending spacer bars, rods or ribs and over which a continuous wire is wrapped in a carefully spaced spiral configuration to provide a predetermined axial gap between the wire turns. The aperture between turns permits formation fluids to flow through the screen, while the closely spaced wire turns exclude fine particulate material such as sand or gravel which may penetrate the gravel pack.

A problem which arises during initial production following the gravel packing operation is that fine sand may be carried through the gravel pack before the gravel pack bridge stabilizes. It is not unusual to produce a substantial amount of such fine sands before the gravel pack finally consolidates and yields clean production. During the early stages of producing the well after gravel packing, those fines tend to migrate through the gravel pack and screen and lodge within the inner annulus between the outer wire wrap and the perforated mandrel. In some instances, this can cause severe erosion of the screen and ultimate failure of the screen to reduce sand invasion. In other situations, the sand fines may include plugging materials which are carbonaceous, siliceous or organic solids which can completely plug the screen flow passages and terminate production shortly after completion. In deep wells, when the screen becomes plugged and the internal pressure in the production tubing is reduced, the formation pressure can collapse the screen and production tubing. Moreover, when a substantial amount of sand has been lost from the surrounding formation, the formation may collapse with resultant damage to the well casing, liner and/or screen consequent reduction or termination of production.

One attempt to overcome the foregoing problem is to interpose a prepack of gravel aggregate within the annulus between the inner mandrel and the outer wire screen. The prepacked gravel is sized appropriately to exclude the fines which accompany the formation fluid during initial production. Raw gravel, as well as epoxy resin coated gravel, have been used extensively in prepacked well screens. Most prepacked well screens are subject to retrieval problems due to their outer diameter being larger than that of a conventional well screen. In order to make prepacked well screens more easily retrievable, the inner mandrel is usually downsized, therefore creating restrictions in both production bore size and completion tool string bore size.

Some conventional well screens have utilized an inner wire cloth or steel woven fabric filter media in order to achieve maximum annular placement and retention of prepacked filter materials. See, for example, U.S. Pat. Nos. 4,858,691 and 4,856,591. Such woven wire cloth retainers do not provide free flow comparable to the conventional rib-channel design which is characteristic of resistance welded screens. The wire cloth retainer, which is wrapped directly onto the perforated mandrel, only permits free flow to occur where it overlaps flow passages on the mandrel. Even in this instance, flow through the perforations is further restricted where the wire cloth retainer overlaps itself.

The prior art sand screens which utilize fine wire woven cloth retainers can result in plugging due to the fact that the openings in the wire cloth are typically considerably smaller than the flow openings in the outer screen member. In U.S. Pat. No. 4,858,691, for example, the wire cloth fabric mesh is stated to have a mesh size of from about 40 to about 200, which can have a substantially smaller inlet flow area than the inlet flow area of the outer particulate restricting cylinder. It will be appreciated that sand plugging can interfere with the initial development phase of production in wells which are completed by wire cloth fabric mesh screens of the type described in U.S. Pat. No. 4,858,691.

A special clearance prepack well screen as shown in U.S. Pat. No. 5,004,049 provides an outer wire wrap screen slightly larger than an inner wire wrap resistance welded screen. The space in between, referred to as the "micro" annulus, is filled with an aggregate filter material. In such cases where this annular space is filled with loose (or non-consolidated) material, the aggregate is usually silica sand, glass beads, sintered bauxite, or nickel shot. Often times, these aggregate materials are intermixed with a plasticized epoxy resin in order to consolidate the loose material. Consolidation techniques are preferable to packing the annulus loosely due to the tendency of loosely packed material to settle and eventually give rise to a bypass "channeling" effect when subjected to differential pressures.

The packing procedure for conventional special clearance prepack screens utilize vibration and gravity. This type of procedure fails to place aggregate material in a stressed condition, therefore allowing for a channeling failure to occur downhole. This eventually leads to an erosive cut leakage path through the screen and generally yields a catastrophic failure. Since these dual screen prepacks are intended to be used in conjunction with a gravel pack completion (as primary sand control), they are therefore utilized as an "insurance" factor in the case of an insufficient gravel pack. Epoxy bond aggregate substantially reduces the channeling effect. However, bending stresses (as expected in shipping, deviated well bores, rough handling) can cause cracking in the bonded material. This can lead to high entrance velocity passages which in turn could cause catastrophic erosion damage as is encountered with channeling when exposed to formation sand. Silica sand gravel is known to dissolve in HCL and HF acid. Epoxy resin is also highly reactive to acidic formation fluid. These major problems are commonly encountered in conventional well stimulation techniques.

OBJECTS OF THE INVENTION

A general object of the invention is to provide an improved well screen which will exclude sand fines from inflowing formation fluid during the initial production phase following a gravel pack operation, without limiting production of formation fluid.

A related object of the present invention is to maximize the annular placement and retention of a fluid-porous, particulate-restricting member in a well screen having a maximum inner diameter and a minimum outer diameter.

Another object of this invention is to provide an improved prepack well screen which reduces the radial thickness of prepack material without imposing a flow restriction or a strength compromise on the inner mandrel.

Yet another object of the present invention is to provide an improved well screen having a prepack of aggregate material which is sized appropriately to exclude sand fines of a predetermined size, and which is porous and inherently stable with a mechanical strength comparable to conventional gravel aggregate prepack screens.

A related object of the invention is to provide a tubular well screen having a prepack of stabilized aggregate material which is highly resistant to acid treatment and stimulation compounds, as well as high chloride/high temperature corrosive well conditions.

Yet another object of the present invention is to provide an improved well screen which is adapted for use in well completions having a relatively low entrance velocity of formation fluids, for example, in horizontal completions.

Still another object of the invention is to provide an improved well screen of the character described having a prepack of inherently stable, porous aggregate material which is highly resistant to cracking caused by bending stresses.

A related object of the present invention is to provide an improved well screen of the character described having a prepack of inherently stable, porous aggregate material which is not subject to bypass channeling caused by settling of unconsolidated aggregate material.

Another object of the present invention is to provide an improved well screen of inherently stable, porous aggregate material which is resistant to plugging by sand fines.

Still another object of the present invention is to provide an improved well screen having an inherently stable prepack of porous, consolidated aggregate material.

Yet another object of the present invention is to minimize the volume of prepack aggregate material in a well screen having a maximum inner diameter and a minimum outer diameter, without sacrificing the screen's ability to exclude sand fines of a predetermined size.

SUMMARY OF THE INVENTION

The foregoing objects are achieved according to one aspect of the present invention by a prepack well screen assembly in which the prepack is made in one piece entirely of sintered powdered metal which is molded to form a metallurgically integral rigid tubular structure. The term "metallurgically integral" as used herein means that the aggregate metal particles are bonded together by interatomic diffusion as a result of sintering the particles under high temperature and pressure conditions.

This invention employs the use of a sintered porous tube body to effectively replace the inner retention screen (welded or woven), and the aggregate material (sand, epoxy, nickel shot, etc.). This material can be constructed of stainless steel, high nickel alloys, bronze coated with nickel, etc. Sintered porous steel slivers are bonded by pressing or molding metal powders into a flat sheet or concentric tube form. Flat sheets are rolled and welded (seam) to form a tube.

The prepack well screen assembly has an outer wire wrap screen concentrically mounted in radially spaced relation on a perforated mandrel, thereby defining a prepack annulus for receiving the sintered metal prepack. In the outer screen, the longitudinal spacing distance between adjacent turns selectively excludes sand fines of a predetermined minimum size. The porosity of the sintered metal prepack is selected to pass sand fines in the range of 20 microns to 150 microns, which is the size of the sand particles which are produced during the early stages of production before consolidation of the main gravel pack. Accordingly, the effective inlet flow area through the sintered metal prepack screen is substantially greater than the effective inlet flow area through the outer screen in any selected zone of sand screen interface area.

Operational features and advantages of the present invention will be understood by those skilled in the art upon reading the detailed description which follows with reference to the attached drawings.

DETAILED DESCRIPTION OF THE PREFERRED EMBODIMENT

Figure 1:
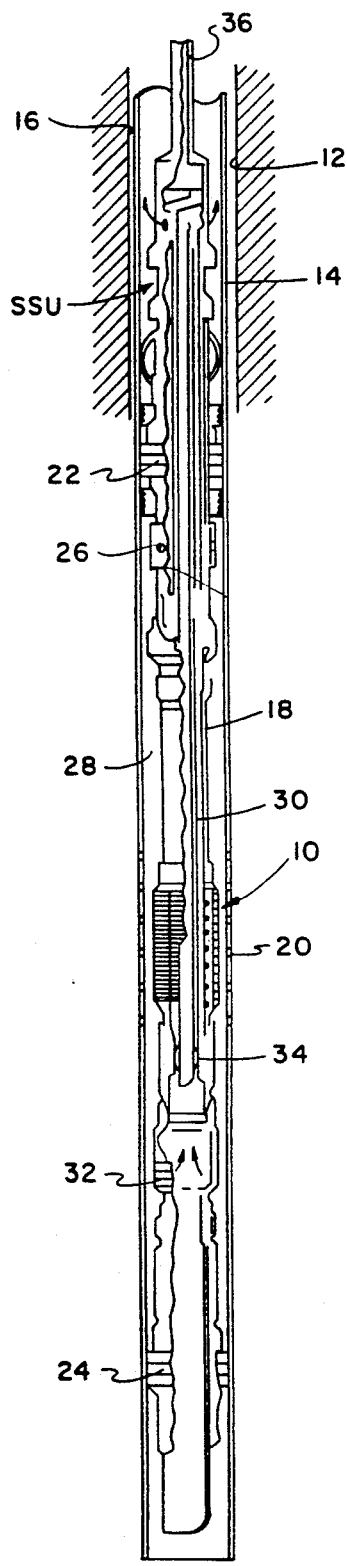
FIG. 1 is an elevational view, partially in section and partially broken away, of an oil well completion having a prepack well screen of the present invention suspended at a producing zone.

In the description which follows, like parts are indicated throughout the specification and drawings with the same reference numerals, respectively. The drawings are not necessarily to scale and the proportions of certain parts have been exaggerated to better illustrate details of the invention.

Figure 2:
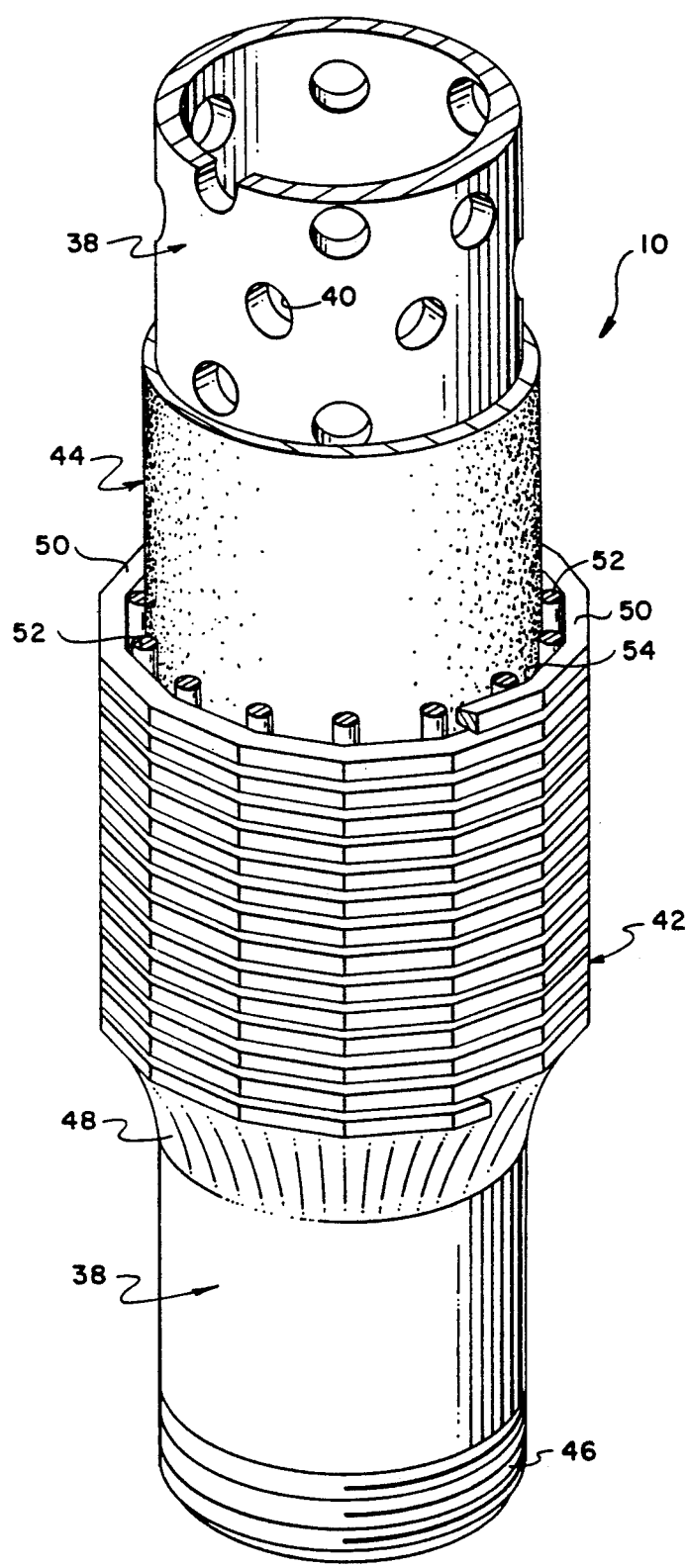
FIG. 2 is a perspective view, partially broken away, of a prepack well screen assembly constructed according to the teachings of the present invention.

Referring now to FIGS. 1 and 2, a well screen prepack assembly 10 is shown incorporated in a conventional subsurface well completion. A well bore 12 has been reinforced by tubular casing 14 and sealed with cement 16. A production tubing 18 has been run inside the casing 14. The casing 14 is perforated by openings 20 at the depth where production fluids are to flow from the producing zone of the well into the production tubing 18.

The well screen 10 is located opposite the perforations 20 in the casing as the production tubing 18 is run into the well, or it may be run directly opposite an open formation. The annulus between the production tubing and the casing 14 is sealed off by an upper packer 22 and a lower packer 24 to produce formation fluids from the producing zone only.

Flow ports 26 are provided in the tubing string 18 below the upper packer 22 and above the sand screen 10 through which gravel mixed with water or gel is injected or circulated by a service seal unit (SSU) into the annulus 28 between the casing 14 and the sand screen 10. To do so, a wash pipe 30 is run inside the tubing string 18 to spot the gravel slurry of water and/or gel below the sand screen 10 or around a telltale screen 32 which is mounted below the primary sand screen 10. By providing the primary sand screen 10 and the lower telltale screen 32, premature gravel packing around the primary screen is prevented and a sand bridge is thus avoided at that spot.

A polished bore nipple 34 is run between the primary screen 10 and the telltale screen 32 in which the wash pipe 30 is landed in sealing engagement in order to circulate the slurry to the telltale screen 32. In this way, any premature spotting of gravel is prevented. When the annulus 28 between the casing 14 and the screen 10 is fully packed, the surface pumps will indicate a pressure jump, which serves to squeeze the remaining water and/or gel from the annulus into the formation. The slurry of gel and gravel is then dehydrated by the oil or gas bearing formation. At the same time, the perforations 20 are filled with gravel. A greater jump in pressure indicates the conclusion of the gravel pack operation. Finally, the wash pipe 30 is pulled out of the polished nipple 34 and the service seal unit SSU is pulled out of engagement with the packer 22 by retraction of a work string 36.

The primary sand screen 10 is illustrated in detail in FIG. 2. The primary sand screen 10 is a prepacked assembly which includes a perforated tubular mandrel 38 of a predetermined length, for example, 20 feet. The tubular mandrel 38 is perforated by radial bore flow passages 40 which follow parallel spiral paths along the length of the mandrel 38. The bore flow passages 40 provide for fluid flow through the mandrel to the extent permitted by an external screen 42 and an internal prepack 44. The bore flow passages 40 may be arranged in any desired pattern and may vary in number in accordance with the area needed to accommodate the expected formation fluid flow through the production tubing 18.

The perforated mandrel 38 preferably is fitted with a threaded pin connection 46 at its opposite ends for threaded coupling with the polished nipple 34 and the production tubing 18. The outer wire screen 42 is attached onto the mandrel 38 at opposite end portions thereof by annular end welds 48.

The outer screen 42 is a fluid-porous, particulate-restricting member which is formed separately from the mandrel 38. In the preferred embodiment, the outer screen 42 has an outer screen wire 50 which is wrapped in multiple turns onto longitudinally extending outer ribs 52, preferably in a helical wrap. The turns of the outer screen wire 50 are longitudinally spaced apart from each other, thereby defining rectangular fluid flow apertures. The apertures are framed by the longitudinal ribs 52 and wire turns for conducting formation fluid flow while excluding sand and other unconsolidated formation material.

Figures 3, 4, 5:
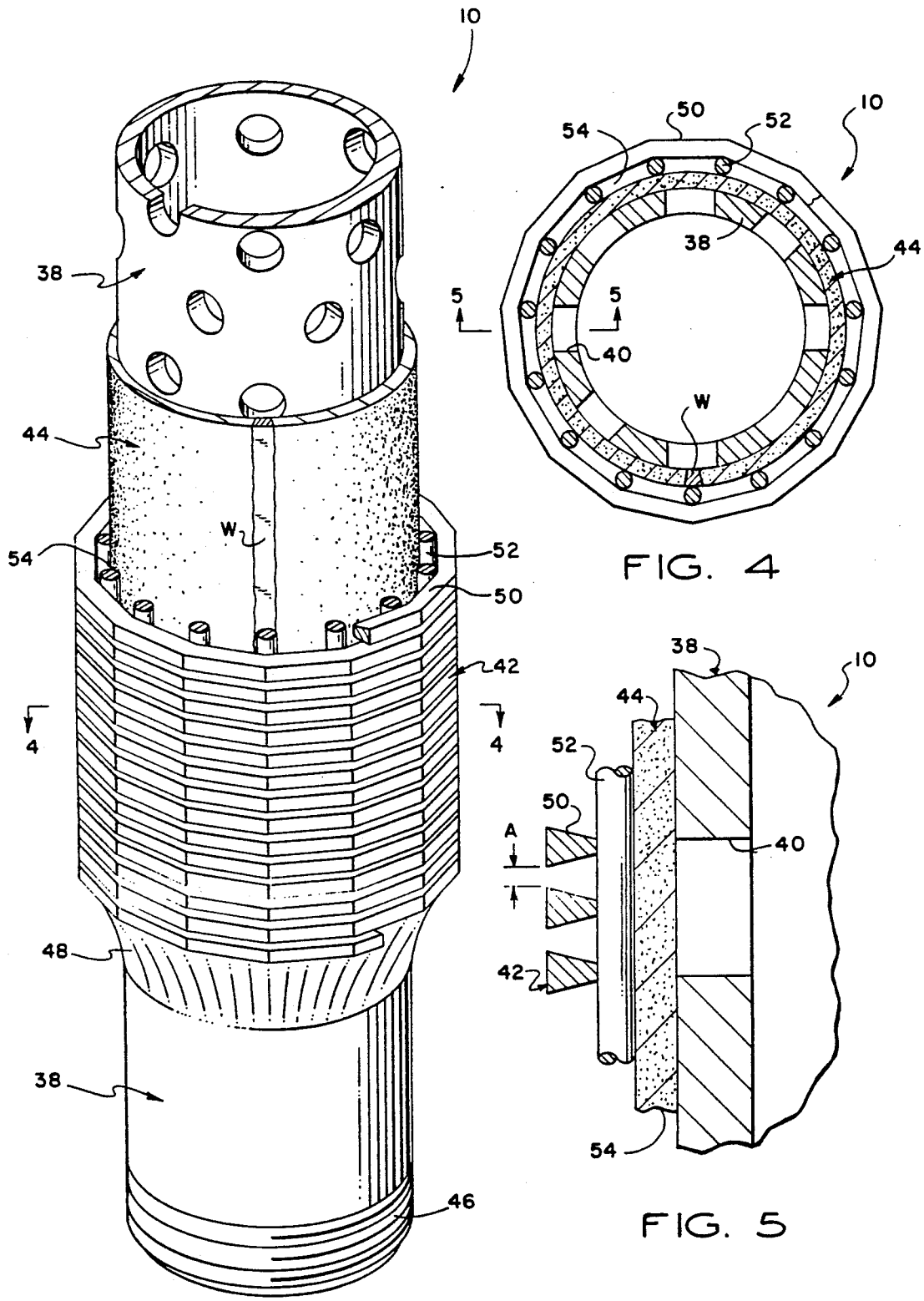
FIG. 3 is a perspective view, partially broken away, of the well screen prepack assembly shown in FIG. 2.
FIG. 4 is a sectional view of the dual screen prepack assembly taken along the lines 4—4 of FIG. 2.
FIG. 5 is an enlarged sectional view of a portion of the dual screen prepack assembly taken along the lines 5—5 of FIG. 4.

As shown in FIG. 5, the outer screen wire 50 is typically 90 mils wide by 140 mils tall in a generally trapezoidal cross section. The maximum longitudinal spacing A between adjacent turns of the outer wire wrap is determined by the maximum diameter of the fines which are to be excluded. Typically, the aperture spacing A between adjacent wire turns is 20 mils. This provides approximately 20 square inches of inlet flow area per linear foot through the outer screen 42, assuming an outside diameter of 2.97 inches.

The outer screen wire 50 and the outer ribs 52 are formed of stainless steel or other weldable material and are joined together by resistance welds at each crossing point of the outer screen wire 50 onto the outer ribs 52 so that the outer screen 42 is a unitary assembly which is self-supporting prior to being mounted onto the mandrel 38. The outer ribs 52 are circumferentially spaced with respect to each other and have a predetermined diameter for establishing a prepack annulus 54 of an appropriate size for receiving the prepack sleeve 44. The longitudinal ribs 52 serve as spacers between the inner prepack sleeve 44 and the outer screen 42.

The prepack sleeve 44 and the surrounding screen 42 must be capable of withstanding rough handling during transportation and run-in as well as extreme downhole well conditions, such as a temperature range of from about 50 degrees Celsius to about 300 degrees Celsius, a formation fluid pH of from about 6 to about 12, high formation pressure up to about 2,000 psi, and contact with corrosive formation fluids containing sulfurous compounds such as hydrogen sulfide or sulphur dioxide in concentrations up to about 20% by weight.

In the preferred embodiment, the inner prepack sleeve 44 is concentrically disposed about the tubular mandrel 38, and is concentrically disposed in the prepack annulus 54 inside of the outer screen 42. The inner prepack member 44 is thus stabilized by engagement against the tubular mandrel 38, and outer screen assembly 42.

The fines which are initially produced following a gravel pack operation have a fairly small grain diameter, for example, 20–40 mesh. Accordingly, the spacing dimension A (FIG. 5) between adjacent turns of the outer screen wire 50 is selected to exclude sand fines which exceed 20 mesh.

The prepack sleeve 44 is separately formed from the mandrel 38 and from the outer screen 42 and comprises a unitary, porous body of sintered powdered metal. The metal preferably is a corrosion resistant metal such as stainless steel or nickel and nickel chromium alloys such as are sold under the trademarks MONEL and INCONEL. Preferably, the sintered metal prepack sleeve 44 provides a matrix having a pore size of about 20–150 microns, corresponding generally to about 10–60 mesh.

The sintered metal prepack sleeve 44 is fabricated by an isostatic press technique. In the isostatic press technique, powdered metal of an appropriate particle length, for example, 50–1,400 microns stainless steel slivers, are poured into a tubular mold of the appropriate length and diameter. The powdered metal is then pressed within the mold at about 65,000 psi (4,569 Kg/cm$^2$) for twenty minutes to two hours to form a powdered metal sleeve. The compressed, powdered metal sleeve is then transferred to a sintering oven which is heated to a temperature in the range of 1,600–2,100 degrees F. (871–1,148 degrees Celsius) for several hours. After the sintering cycle has been completed, the sintered sleeve is allowed to cool and undergoes further processing in which it is cut to the desired length.

The porous metal prepack sleeve has varying average pore size distribution as determined by the individual sliver sizes of metal powders used. For stainless steel and high nickel alloy embodiments, the particle length is preferably in the range from 0.001 inch to 0.006 inch. For nickel coated bronze, the particle length may range from 0.001 inch to 0.020 inch. After pressing (or forming), the porous tubes are sintered in a furnace in order to achieve full bonding of individual grains, leaving pore spaces. The result is an all metal, consolidated aggregate prepack sleeve.

Construction of a special clearance sintered porous metal outer wire wrap screen is initiated with the perforated mandrel base. A perforated mandrel 38 supports the sintered prepack sleeve 44 and outer wire wrapped screen 42. Over the perforated mandrel 38 is placed a thin-walled (high permeability) sintered porous metal sleeve 44 having a sidewall thickness in the range of from about 0.025 inch–0.200 inch. Typically, however, the sintered tube has a sidewall thickness of 1/16 to $\frac{1}{8}$ inch. Standard heavy-duty construction of the wire wrap 42 is employed in order to protect the sintered metal prepack sleeve 44.

As a result of the foregoing sintering process, the prepack sleeve 44 is made entirely of sintered powdered metal which is molded to form a metallurgically integral rigid structure. During the heating step, the aggregate metal slivers are bonded together by interatomic diffusion as a result of sintering the particles under high temperature and pressure conditions. The porosity is proportional to the initial particle size and the isostatic pressure. Stainless steel slivers having an average length of 50–1,400 microns when compressed at about 60,000 psi (4,218 Kg/cm$^2$) and sintered at from about 1,800 degrees F. (982 degrees Celsius) to about 2,100 degrees F. (1,148 degrees Celsius) as set forth above will yield pores of about 100 microns, which corresponds with about 40 mesh.

Figure 6:
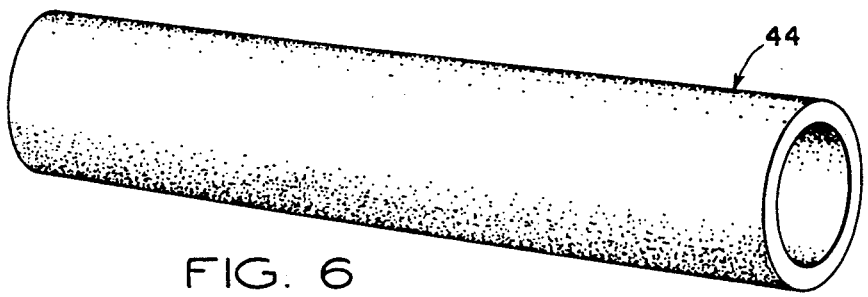
FIG. 6 is a perspective view of the seamless sintered metal prepack shown in FIG. 2.
Figure 7:
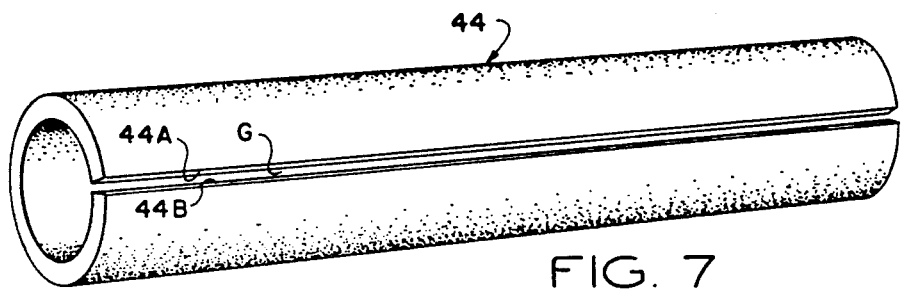
FIG. 7 is a perspective view of the welded sintered metal prepack shown in FIG. 3.
Figure 8:
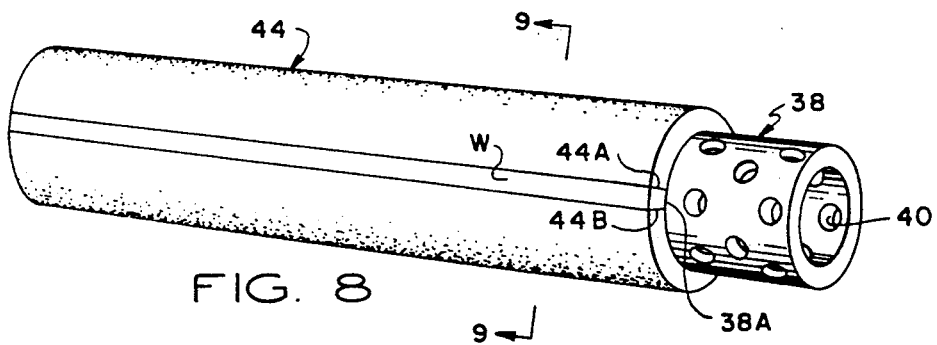
FIG. 8 is a perspective view, partially broken away, of a welded sintered metal prepack assembled onto a perforated mandrel.
Figure 9:
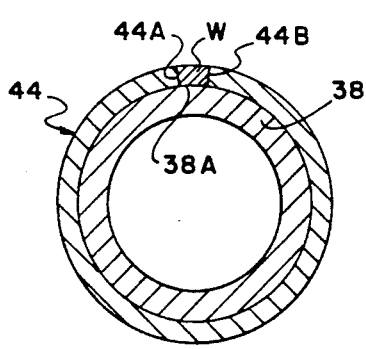
FIG. 9 is a right sectional view taken along the line 9—9 of FIG. 8.

The sintered metal prepack tube can be constructed in a concentric, seamless tubular form as shown in FIGS. 2 and 6. When the seamless, tubular form is used, the prepack sleeve 44 is welded at each end to the external surface of the mandrel 38.

Referring now to FIGS. 3, 4, 5, 7, 8, and 9, the sintered metal prepack tube 44 is fabricated by pressing metal slivers into a flat sheet, sintering and then rolling the sheet in the form of a right circular cylinder. The perforated mandrel 38 is then inserted into the rolled cylinder 44, and the longitudinal edge portions 44A, 44B are welded together by a longitudinal seam weld W.

According to one aspect of the present invention, an external surface portion 38A of the mandrel 38 is joined in a metallurgical union with the seam weld W. The rolled edge portions 44A, 44B and the mandrel surface 38A being welded together during a single pass of a welding tool along the gap G which extends between the longitudinal edges 44A, 44B of the rolled prepack tube 44.

After the sintered metal prepack sleeve 44 has been welded onto the perforated mandrel 38, the assembly is inserted into the bore of the outer screen 42. The longitudinal ribs 52, the outer wrapping wire 50, and the sintered prepack sleeve 44 are welded together onto the lower end of the mandrel 38 by the annular weld 48. The sintered metal prepack member 44 is retained within the prepack annulus 54 by the annular weld 48, the outer screen 42 and the mandrel 38. After the mandrel 38 and prepack sleeve 44 have been loaded into the prepack annulus 54, the opposite end portions of the outer longitudinal ribs 52, the outer screen wire turns 50 and the inner prepack member 44 are joined together and secured to the upper end of the mandrel 38 by an annular weld 48. According to this arrangement, the prepack sleeve 44 becomes a unitary part of the mandrel 38 and is ready for service.

According to an important feature of the invention, production flow is not limited or blocked by localized accumulation of fines on the prepack sleeve 44 for the reason that the effective inlet flow area of the prepack sleeve 44 is substantially greater than the effective inlet flow area of the outer screen 42. This is made possible by selecting the porosity per unit area of the sintered metal prepack sleeve 4 to be substantially greater than the flow area provided by the outer wire 50 and longitudinal rib 52 of the outer screen 42.

It is desirable to obtain a pore size yield which will permit the passage of sand fines in the range of 20 microns–150 microns, which is the size of fine sand particles which are produced during the early stages of production before the gravel pack finally consolidates and yields clean production. Accordingly, in some applications, it is desirable to increase the porosity to the range of 100 to 200 microns which will permit passage of fines in the size range of 40–60 mesh, which is the size which may cause plugging before the gravel pack consolidates.

In one embodiment of the invention, the sintered metal prepack sleeve 44 is subjected to electropolishing to increase its porosity to yield a screen having an effective porosity of 40-60 mesh, with the pore size in the range of 100-200 microns, and with an average pore size of about 150 microns. Electropolishing is an electrochemical process where metal is removed rather than deposited. In the electropolishing process, the sintered metal prepack sleeve 44 forms the anode in an appropriate electrolyte bath which, when voltage is applied, forms a polarized skin or film over the entire surface of the sintered metal prepack sleeve 44. The film is the thickest over the microdepressions and thinnest over the microprojections on the surface of the sintered metal prepack sleeve. Where the polarized film is the thinnest, the electrical resistance is the least and therefore the rate of metallic dissolution is the greatest. Accordingly, in the electropolishing step, the microscopic high points on the surface of the screen are selectively removed much faster than the microscopic valleys, thereby yielding a very flat, smooth and bright surface.

An unexpected benefit of the electropolishing process is that the pore size is increased as sintered metal material is removed from the microscopic valleys. For the previous example of a sintered metal prepack sleeve 44 made of slivers of stainless steel having a length in the range of 50-1,400 microns and compacted at 60,000 psi (4,218 Kg/cm$^2$), an initial average pore size of about 100 microns or less was achieved. However, after electropolishing to produce a smooth surface, the average pore size was increased to about 150 microns, which is equivalent to 40-60 mesh.

As a result of the electropolishing, corrosion resistance is improved by removing scratches, metal debris and embedded abrasive particles. Mechanical stress is removed as a result of the electropolishing step by removing surface damage and cold work effects from the surface skin of the prepack sleeve 44. Moreover, the electropolishing procedure produces a non-particulating surface on the sintered metal prepack sleeve by providing as much as 90 percent reduction in the external surface area. By removing most of the surface irregularities, very few nucleation sites remain where particles in the size range of 20 microns-150 microns can become captured or otherwise lodged to cause plugging. Electropolishing further reduces the coefficient of friction of the external surface of the sintered metal prepack sleeve because rough projections on the surface are either removed or rounded.

Figure 10:
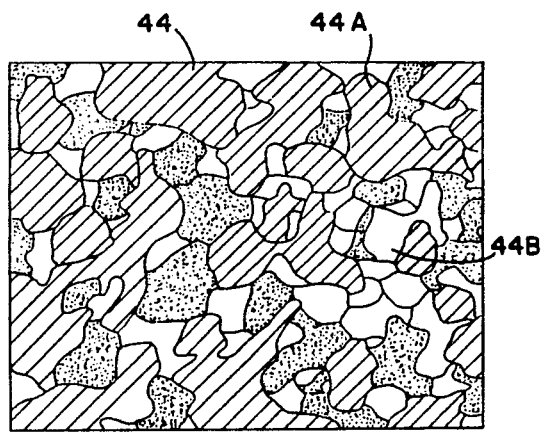
FIG. 10 is a greatly enlarged pictorial representation of a microscopic section taken through an external surface region of a sintered metal prepack made according to the present invention.

The microscopic section shown in FIG. 10 illustrates the enlargement of the matrix pores obtained by electropolishing the sintered metal prepack sleeve 44. It will be noted that the edges of each particle 44A are rounded, and that the pore openings 44B, although irregular in shape, have an opening size in the range of from about 100 to about 200 microns.

The sintered metal prepack of the present invention provides significant technical advantages in the petroleum production industry. The porosity of the sintered metal prepack sleeve is determined primarily by choice of metal particle size and can be increased as required by electropolishing to exclude sand fines which may cause plugging, and is inherently stable with a mechanical strength comparable to conventional wire wound screens. Screen surface irregularities are removed by electropolishing, thereby reducing the number of nucleation sites where sand fines would otherwise be captured to cause plugging.

The sintered metal material of the prepack sleeve 44 is made of corrosion resistant alloy metal slivers which are resistant to acid treatment and stimulation compounds, as well as high chloride/high temperature well conditions. Because the sintered metal prepack sleeve can be fabricated in continuous lengths of 20-30 feet (6-9 meters) or more, it has a relatively large inflow surface area which is particularly well adapted for use in completions having a relatively low entrance velocity of formation fluids, for example, in horizontal completions.

Moreover, the prepack sleeve 44 of the present invention is constructed of inherently stable sintered metal slivers, and can be molded, machined, cut to size, welded and worked in the same manner and with the same tools as conventional production tubing. The sintered metal prepack sleeve can be fabricated to any desired length, and can be machined and worked in the same manner as conventional production tubing. It will be appreciated that the invention provides the following important advantages over conventional prepacks:

1) The aggregate material of the prepack sleeve is stainless steel, or other corrosion resistant alloys, and is therefore highly resistant to corrosion caused by downhole conditioning as well as corrosive stimulation fluids.

2) The sintered metal consolidation is stronger and more ductile than epoxy resin prepacks, and will bend without cracking, unlike epoxy consolidations.

3) It is well adapted for use in downhole environments that require "insurance" against a failed gravel pack (i.e., voids in pack), and prevents the channeling effect common to prepacks made of unconsolidated gravel.

4) Its high strength negates the need for annular prepack thickness, therefore allowing the strand diameter of the wire wrap to be reduced while still affording maximum erosion protection. This provides greater annular space for pack placement.

5) Sintered metal bonding eliminates chemical bonding, and is more resistant to a high temperature environment, corrosive than silica sand or epoxy.

Although the invention has been described with reference to an oil well completion, and with reference to particular preferred embodiments, the foregoing description is not intended to be construed in a limiting sense. Various modifications of the disclosed embodiment as well as alternative applications, for example, filtering unconsolidated material out of inflowing well fluid in water, gas and oil wells, and environmental wells, including monitoring wells, recovery wells and disposal wells, in horizontal as well as vertical completions, will be suggested to persons skilled in the art by the foregoing specification and illustrations. It is therefore contemplated that the appended claims will cover any such modifications or embodiments that fall within the true scope of the invention.

What is claimed is:

1. A well screen for separating particulated material from formation fluid comprising, in combination:
   a perforated, tubular mandrel;
   a fluid-porous, particulate-restricting member mounted on said mandrel in radially spaced relation with respect to said mandrel, thereby defining a prepack annulus therebetween; and,
   a permeable sleeve of sintered metal disposed within said prepack annulus.

2. A well screen as defined in claim 1, wherein the sintered metal sleeve has a sidewall radial thickness in the range of from about 0.025 inch to about 0.200 inch.

3. A sand screen assembly as defined in claim 1, wherein said fluid-porous, particulate-restricting member comprises circumferentially spaced, longitudinally extending rib wires and a screen wire wrapped externally about said rib wires in a longitudinally spaced pattern, thereby defining longitudinally spaced screen apertures for conducting formation fluids through said outer screen, said longitudinally extending rib wires being disposed between said external screen wire and said sintered metal sleeve.

4. A well screen as defined in claim 1, including an annular weld connecting end portions of the sintered metal sleeve and the particulate-restricting member onto said mandrel at opposite ends thereof, respectively.

5. A well screen as defined in claim 1, wherein said sintered metal sleeve is formed by rolling a flat sheet of sintered metal into a right circular cylinder, and thereafter welding the adjacent edge portions together.

6. A well screen as defined in claim 1, wherein said sintered tube is formed by rolling a flat sheet of sintered metal into a right circular cylinder, with the adjacent edge portions of the rolled cylinder being welded together and being welded to said tubular mandrel along a longitudinal weld seam.

7. A well screen as defined in claim 1, wherein said permeable sleeve of sintered metal comprises a seamless tube.

8. A sand screen for placement within a well bore comprising, in combination:
   an elongated tubular mandrel having a plurality of longitudinally spaced apertures formed radially therethrough;
   an outer wire screen mounted onto said mandrel in substantially concentric alignment with said mandrel, said outer wire screen having circumferentially spaced, longitudinally extending outer rib wires and an outer screen wire wrapped externally about said outer rib wires and welded thereto at substantially all points of contact therewith, thereby defining longitudinally spaced outer screen apertures for conducting formation fluids through said outer screen;
   an annular weld formed on said mandrel and connecting the end portions of said outer screen wires and said outer rib wires together for centering said screen in radially spaced relation with said mandrel, thereby defining a prepack annulus; and,
   a permeable, sintered metal sleeve disposed within said prepack annulus.

9. A well screen for separating unconsolidated material out of inflowing well fluid in water, oil, gas and recovery wells, characterized by a tubular, porous body of sintered powdered metal, the porous body of sintered powdered metal comprising compressed metal slivers having an uncompressed length in the range of from about 50 microns to about 1,400 microns.

10. A well screen as defined in claim 9, wherein the powdered metal is stainless steel.

11. A well screen as defined in claim 9, wherein the powdered metal is nickel.

12. A well screen as defined in claim 9, wherein the powdered metal comprises nickel chromium alloy.

13. An improved well screen of the type having a fluid-porous, particulate-restricting member for separating unconsolidated material out of formation fluid, characterized in that the particulate-restricting member is a porous, tubular body of sintered powdered metal formed by the following steps:
   depositing metal slivers having an average length of from about 50 microns to about 1,400 microns into a mold;
   compressing the metal slivers within the mold; and,
   baking the compressed slivers in an oven at a temperature sufficient to cause the slivers to become tacky and bonded to each other, thereby forming a metallurgically integral, porous structure having pore openings in the flow area size range of from about 20 microns to about 150 microns.

14. A well screen for separating particulated material from formation fluid comprising, in combination:
   a perforated, tubular mandrel;
   a permeable sleeve of sintered metal concentrically mounted on said tubular mandrel; and,
   a fluid-porous, particulate-restricting member mounted on said sintered metal sleeve.

15. A sand screen assembly as defined in claim 14, wherein said fluid-porous, particulate-restricting member comprises circumferentially spaced, longitudinally extending outer rib wires and a screen wire wrapped externally about said outer rib wires in a longitudinally spaced pattern, thereby defining longitudinally spaced screen apertures for conducting formation fluids through said outer screen, said longitudinally extending outer rib wires being disposed between said external screen wire and said sintered metal sleeve.

16. A well screen as defined in claim 14, wherein said sintered metal sleeve comprises a flat sheet of sintered metal rolled substantially in the form of a right circular cylinder, with its adjacent edge portions being welded together.

17. A well screen as defined in claim 14, wherein said sintered metal tube comprises a flat sheet of sintered metal rolled substantially in the form of a right circular cylinder, with its adjacent edge portions being welded together and being welded to said tubular mandrel along a longitudinal weld seam.

18. A well screen as defined in claim 14, wherein said permeable sleeve of sintered metal comprises a seamless tube.

19. A sand screen for placement within a well bore comprising, in combination:
   an elongated mandrel having a tubular sidewall and a plurality of longitudinally spaced apertures formed radially therethrough;
   a permeable, sintered metal sleeve concentrically mounted on said mandrel; and,
   a wire screen mounted on said mandrel in substantially concentric alignment with said sintered metal sleeve, said wire screen having a wire wrapped externally about said sintered metal sleeve, thereby defining longitudinally spaced outer screen apertures for conducting formation fluids.

20. A method for making a prepack sleeve for a well screen comprising the steps:
   (a) producing metal slivers in average lengths in the range of from about 50 microns to about 1,400 microns;
   (b) compressing the slivers to approximately 60,000 to 65,000 pounds per square inch within a mold; and,
   (c) sintering the compressed slivers in an oven at a temperature in the range of from about 1,600 to about 2,100 degrees Fahrenheit until the slivers become tacky and bond to each other.

21. The method for making a prepack sleeve as defined in claim 20, wherein the compressing step (b) is carried out within a mold having a cavity for producing a flat sheet of compressed metal slivers, and after the compressed metal slivers have been sintered in step (c), rolling the flat sheet of sintered metal substantially into the form of a cylinder, and thereafter welding the abutting edge portions of the cylinder together.

22. The method for making a prepack sleeve as defined in claim 20, wherein the compressing step (b) is carried out within a mold having a cavity for producing a flat sheet of compressed metal slivers, and after the compressed slivers have been sintered in step (c), rolling the flat sheet of sintered metal substantially into the form of a cylinder, with the adjacent edge portions of the rolled cylinder of sintered metal being welded together and being welded to a tubular mandrel along a longitudinal weld seam.

* * * * *

UNITED STATES PATENT AND TRADEMARK OFFICE
CERTIFICATE OF CORRECTION

PATENT NO. : 5,190,102

DATED : March 2, 1993

INVENTOR(S) : Bryant A. Arterbury, James E. Spangler, Thomas V. Malorzo

It is certified that error appears in the above-indentified patent and that said Letters Patent is hereby corrected as shown below:

column 11,
  Claim 6, line 24, after --sintered-- and before --tube--, insert --metal--.

Signed and Sealed this

Twenty-seventh Day of September, 1994

Attest:

BRUCE LEHMAN

Attesting Officer

Commissioner of Patents and Trademarks